US008200416B2

(12) United States Patent
Aspen

(10) Patent No.: US 8,200,416 B2
(45) Date of Patent: Jun. 12, 2012

(54) METHODS AND SYSTEMS FOR CONTROLLING DISPLAY OF EN-ROUTE MAPS

(75) Inventor: Sven D. Aspen, Sherwood, OR (US)

(73) Assignee: The Boeing Company, Chicago, IL (US)

(*) Notice: Subject to any disclaimer, the term of this patent is extended or adjusted under 35 U.S.C. 154(b) by 1137 days.

(21) Appl. No.: 11/548,208

(22) Filed: Oct. 10, 2006

(65) Prior Publication Data

US 2007/0168122 A1 Jul. 19, 2007

Related U.S. Application Data

(60) Provisional application No. 60/753,298, filed on Dec. 22, 2005.

(51) Int. Cl.
G01C 21/00 (2006.01)
(52) U.S. Cl. .............. 701/207; 701/4; 701/9; 701/14; 701/120; 701/456; 701/457; 701/460; 701/300; 701/301; 701/302; 342/29; 340/901; 340/903; 340/945; 340/961; 340/963; 340/971; 340/995.1; 340/995.13; 340/995.19
(58) Field of Classification Search .............. 701/1, 3, 701/200–202, 206–212, 300–302, 14–16; 340/988, 990, 995.1, 995.14, 995.17, 995.24, 340/995.26, 995.16, 995.19
See application file for complete search history.

(56) References Cited

U.S. PATENT DOCUMENTS

| | | | | |
|---|---|---|---|---|
| 5,311,183 A * | 5/1994 | Mathews et al. | | 342/26 B |
| 5,566,073 A * | 10/1996 | Margolin | | 701/213 |
| 6,218,965 B1 * | 4/2001 | Gendron et al. | | 701/208 |
| 6,452,511 B1 * | 9/2002 | Kelly et al. | | 340/970 |
| 6,694,249 B1 * | 2/2004 | Anderson et al. | | 701/120 |
| 6,735,557 B1 * | 5/2004 | Castellar et al. | | 703/5 |
| 6,747,649 B1 | 6/2004 | Sanz-Pastor et al. | | |
| 6,828,922 B1 | 12/2004 | Gremmert et al. | | |
| 7,095,423 B2 | 8/2006 | Cosman et al. | | |
| 7,353,091 B2 * | 4/2008 | Servantie et al. | | 701/4 |
| 7,394,723 B2 * | 7/2008 | Rubin | | 367/13 |
| 2002/0140578 A1 | 10/2002 | Price | | |
| 2003/0060940 A1 | 3/2003 | Humbard et al. | | |

(Continued)

FOREIGN PATENT DOCUMENTS

WO WO00/65423 11/2000

OTHER PUBLICATIONS

European Search Report and Opinion, European Patent Office, International Application No. PCT/US2006/047316, Date of Completion of Search Aug. 31, 2007, 12 pgs.

*Primary Examiner* — Jonathan M Dager
(74) *Attorney, Agent, or Firm* — Armstrong Teasdale LLP

(57) ABSTRACT

Methods and systems for a displaying a moving map display for an aircraft is provided. The method includes determining a route of intended travel of the aircraft on the moving map display, determining a rank of relative importance of a plurality of aeronautical symbols displayed on the moving map display based on the determined route of intended travel, and de-emphasizing at least one navigation symbol with the moving map display based on the at least one navigation symbol determined rank.

18 Claims, 4 Drawing Sheets

U.S. PATENT DOCUMENTS

| | | | |
|---|---|---|---|
| 2003/0132860 A1 | 7/2003 | Feyereisen et al. | |
| 2003/0137444 A1* | 7/2003 | Stone et al. | 342/30 |
| 2003/0193410 A1* | 10/2003 | Chen et al. | 340/971 |
| 2003/0193411 A1* | 10/2003 | Price | 340/973 |
| 2004/0015274 A1* | 1/2004 | Wilkins et al. | 701/3 |
| 2004/0160341 A1* | 8/2004 | Feyereisen et al. | 340/970 |
| 2004/0169663 A1* | 9/2004 | Bernier | 345/629 |
| 2005/0066275 A1* | 3/2005 | Gannon | 715/700 |
| 2005/0264567 A1 | 12/2005 | Sommers | |
| 2005/0264576 A1 | 12/2005 | Sommers | |
| 2006/0217853 A1* | 9/2006 | Servantie et al. | 701/4 |
| 2006/0227012 A1* | 10/2006 | He | 340/945 |
| 2006/0241823 A1* | 10/2006 | Greene | 701/9 |
| 2006/0244638 A1* | 11/2006 | Lettau | 340/995.1 |
| 2006/0250280 A1* | 11/2006 | Chen et al. | 340/974 |
| 2007/0064127 A1* | 3/2007 | Millar | 348/239 |
| 2008/0157946 A1* | 7/2008 | Eberl et al. | 340/435 |
| 2009/0046289 A1* | 2/2009 | Caldwell et al. | 356/341 |
| 2009/0207048 A1* | 8/2009 | He et al. | 340/973 |
| 2009/0319103 A1* | 12/2009 | Dwyer et al. | 701/14 |
| 2010/0033499 A1* | 2/2010 | Gannon et al. | 345/629 |

* cited by examiner

METHODS AND SYSTEMS FOR CONTROLLING DISPLAY OF EN-ROUTE MAPS

CROSS REFERENCE TO RELATED APPLICATIONS

This application claims priority to U.S. Provisional Patent Application Ser. No. 60/753,298 filed Dec. 22, 2005, the contents of which are hereby incorporated by reference.

BACKGROUND OF THE INVENTION

This invention relates generally to aircraft cockpit displays and more particularly, to methods and systems for controlling display of en-route maps on aircraft cockpit displays.

At least some known aircraft include cockpit displays that incorporate moving maps of areas traversed by the aircraft during flight. The moving maps include one or more segments of a route of intended travel of the aircraft over the area. Each segment is usually defined by waypoints marking the beginning and the end of the segment. The moving map may also include one or more aeronautical symbols positioned at predetermined locations on the moving map. Such symbols may be positioned at a specific location marking that location or may be positioned in a location that is merely convenient for displaying the information associated with the symbol. While traversing each segment, certain ones of the displayed aeronautical symbols may have no significance for that segment, but is used in conjunction with flight on other segments that are also displayed on the moving map. Such non-essential symbols to the current segment being traversed may add to information overload of the flight crew, for example, by tending to clutter the display with currently non-essential symbols, which compete with the flight crew's attention. However, removing such currently nonessential symbols from the display is not an option because while traversing other segments on the display, the symbols may hold relevance for those segments.

BRIEF DESCRIPTION OF THE INVENTION

In one embodiment, a method of displaying a moving map display for an aircraft includes determining a route of intended travel of the aircraft on the moving map display, determining a rank of relative importance of a plurality of aeronautical symbols displayed on the moving map display based on the determined route of intended travel, and de-emphasizing at least one navigation symbol with the moving map display based on the at least one navigation symbol determined rank.

In another embodiment, a display system for an aircraft includes a moving map display screen configured to display a moving map representative of an area being traversed by the aircraft, a route of intended travel of the aircraft superimposed on the moving map, and a plurality of aeronautical symbols superimposed on the moving map in predetermined locations, at least one of the plurality of aeronautical symbols including an opacity variable determined by a relative rank of importance associated with the at least one aeronautical symbols wherein the relative rank of importance is determined based on a probability that the aeronautical symbol will be used during traversal along the route of intended travel.

In yet another embodiment, a situational awareness system including a moving map display includes at least one database including first data relating to a digital elevation model of a portion of the earth's surface, the model including a plurality of pixels, the digital elevation model including a location coordinate and an elevation value associated with each pixel; the at least one database further including second data relating to displaying a plurality of chart symbols on the moving map display, the second data including an opacity value associated with the plurality of chart symbols; and a processor coupled to the database. The processor is configured to receive the location coordinate and an elevation value associated with the digital elevation model, receive a route of intended travel for display on the moving map display, determine an opacity value for the plurality of chart symbols based on a relevance of the plurality of chart symbols to the received route of intended travel, and display a moving map including the plurality of chart symbols on the moving map display using the determined opacity value.

DETAILED DESCRIPTION OF THE INVENTION

Figure 1:
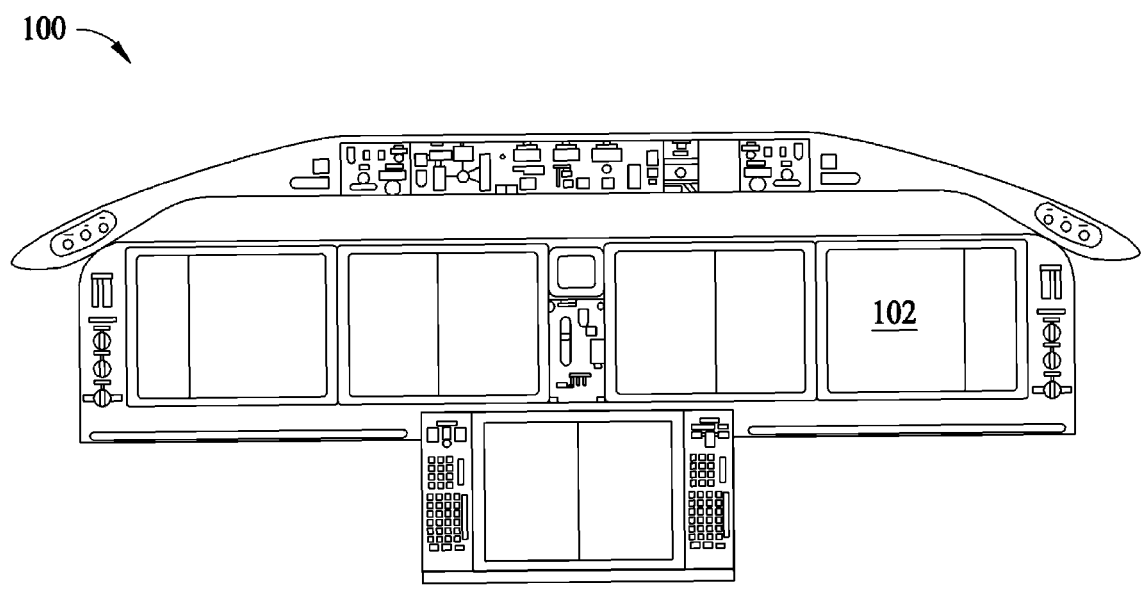
FIG. 1 is a forward perspective view of an exemplary aircraft cockpit display panel that includes at least one display screen in accordance with an embodiment of the present invention.

FIG. 1 is a forward perspective view of an exemplary aircraft cockpit display panel 100 that includes at least one display screen 102 in accordance with an embodiment of the present invention. In the exemplary embodiment, display screen is positioned on aircraft cockpit display panel 100. In an alternative embodiment, display screen 102 is positioned on an auxiliary panel (not shown) located in the cockpit of the aircraft. During aircraft operation, display screen 102 is available for viewing by a pilot and/or co-pilot of the aircraft.

Figure 2:
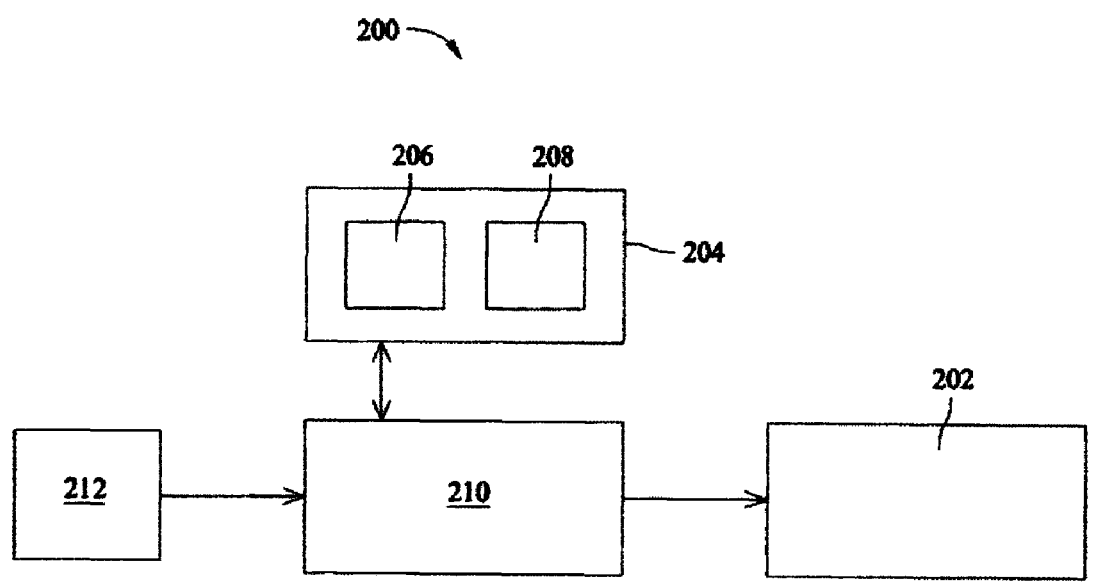
FIG. 2 is a schematic block diagram of an exemplary situational awareness system in accordance with an embodiment of the present invention.

FIG. 2 is a schematic block diagram of an exemplary situational awareness system 200 in accordance with an embodiment of the present invention. In the exemplary embodiment, situational awareness system 200 includes a moving map display 202 that includes at least one database 204 including first data 206 relating to a digital elevation model of a portion of the earth's surface. The model includes a plurality of pixels and a location coordinate and an elevation value associated with each pixel. At least one database 204 further includes second data 208 relating to displaying a plurality of chart symbols (not shown in FIG. 2) on moving map display 202 wherein second data 208 includes an opacity value associated with the plurality of chart symbols. In an alternative embodiment, the first data is included in a first database of the at least one database and the second data is included in a second database of the at least one database wherein the first database and second database are separate databases. Situational awareness system 200 also includes a processor 210 communicatively coupled to database 204. Processor 210 is configured to receive the location coordinate and an elevation value associated with the digital elevation model from a user input device 212, receive a route of intended travel for display on moving map display 202, determine an opacity value for the plurality of chart symbols based on a relevance of the plurality of chart symbols to the received route of intended travel, and display a moving map including the plurality of chart symbols on the moving map display using the determined opacity value.

In the exemplary embodiment, processor 210 is further configured to determine a probability that each symbol provides information for traversing a portion of the received route of intended travel. Based on the determined probability, processor 210 is further configured to display the chart symbol as being alpha-blended with the moving map.

As used herein, alpha blending is used to create the effect of transparency by combining a translucent foreground with a background color to create an in-between blend. In the exemplary embodiment, a pixel is represented by at least four channels that define a color of the pixel. Three of these are the primary color channels, for example, red, green and blue. A fourth is termed an alpha channel, which conveys information about transparency of the pixel. The alpha channel specifies how foreground colors are merged with background colors when overlaid on top of each other.

In the exemplary embodiment, alpha blending is represented by the equation:

$$[r, g, b]_{blended} = \alpha[r, g, b]_{foreground} + (1 - \alpha)[r, g, b]_{background} \quad (1)$$

where [r,g,b] are red, green, and blue color channels and α (alpha) is the weighting factor. In other various embodiments, alpha-blending values are calculated differently. The weighting factor α is permitted to take a value from 0 to 1. When α is set to 0, for example, the foreground is completely transparent. When α is set to 1, the associated pixel becomes opaque and totally obscures the background. Any intermediate value creates a mixture of the foreground and background.

Figure 3:
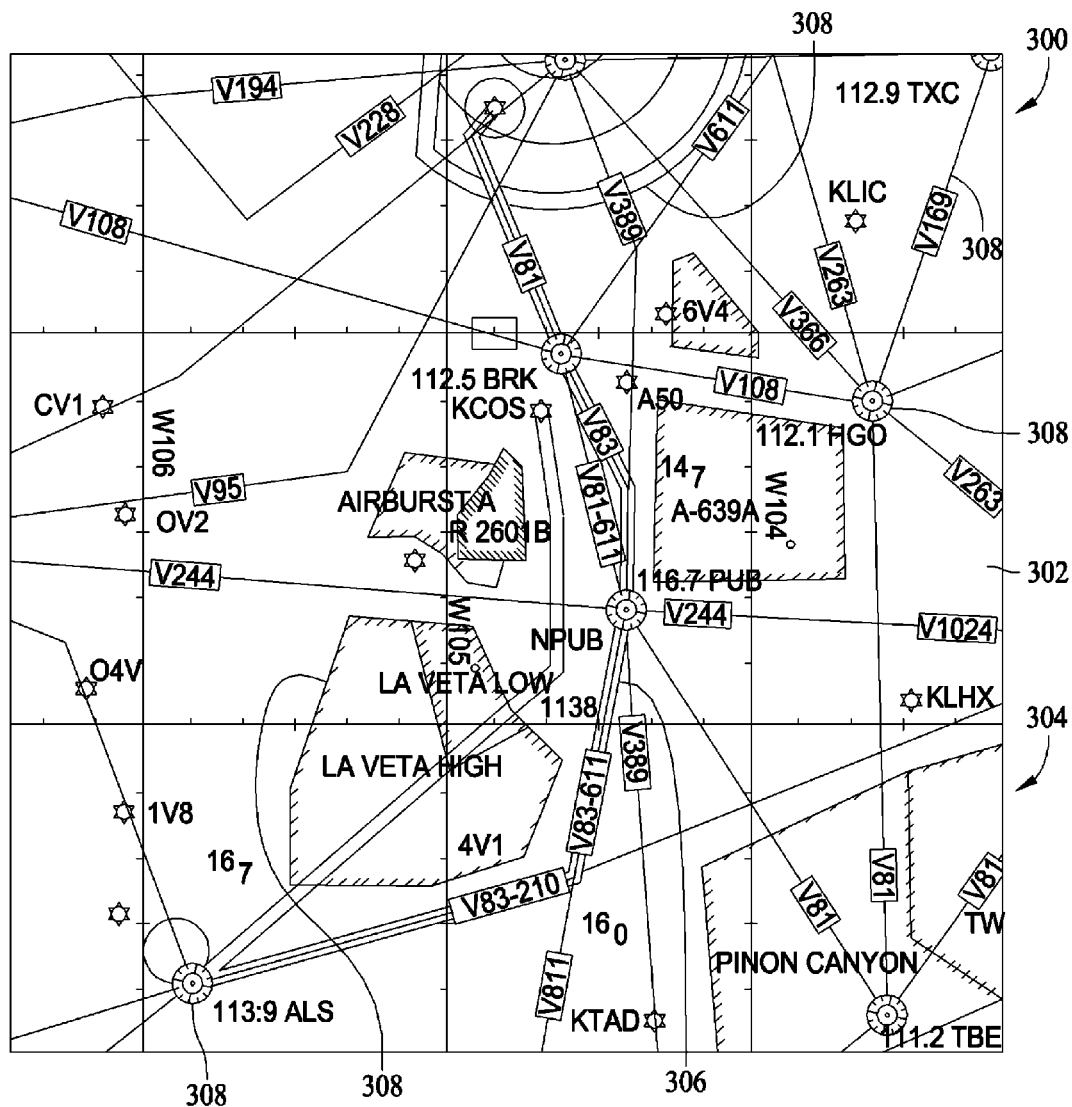
FIG. 3 is a screen shot from an exemplary display system for an aircraft.

FIG. 3 is a screen shot 300 from an exemplary display system for an aircraft. The screen shot includes a moving map display screen 302 configured to display a moving map 304 representative of an area being traversed by the aircraft. Moving map 304 includes a route of intended travel 306 of the aircraft superimposed on moving map 304, and a plurality of aeronautical symbols 308 superimposed on moving map 304 in predetermined locations. The aeronautical symbols are each associated with an opacity variable that is used to emphasize and de-emphasize symbol 308 associated with the opacity variable on moving map 304. Emphasizing a symbol tends to accentuate its appearance on moving map 304 and de-emphasizing a symbol tends to blend the appearance of the symbol with the background of moving map 304 behind the symbol such that the symbol less accentuated with respect to other symbols. In the exemplary embodiment, the de-emphasis of the symbol is controlled by adjusting an alpha-blending value associated with the pixels that comprise the aeronautical symbols.

Plurality of aeronautical symbols 308 each include a rank of relative importance determined based on a probability that that symbol will be used during a current segment along route 306 or a subsequent segment along route 306. In the exemplary embodiment, route of intended travel 306 is determined from a flight plan for the aircraft. In an alternative embodiment, route of intended travel 306 is determined based on an input from a user. The alpha-blending value is selectably toggled using an input from a user such that one or more symbols are blended with the background behind the respective symbols to de-emphasize or emphasize the appearance of symbol 308.

Figure 4:
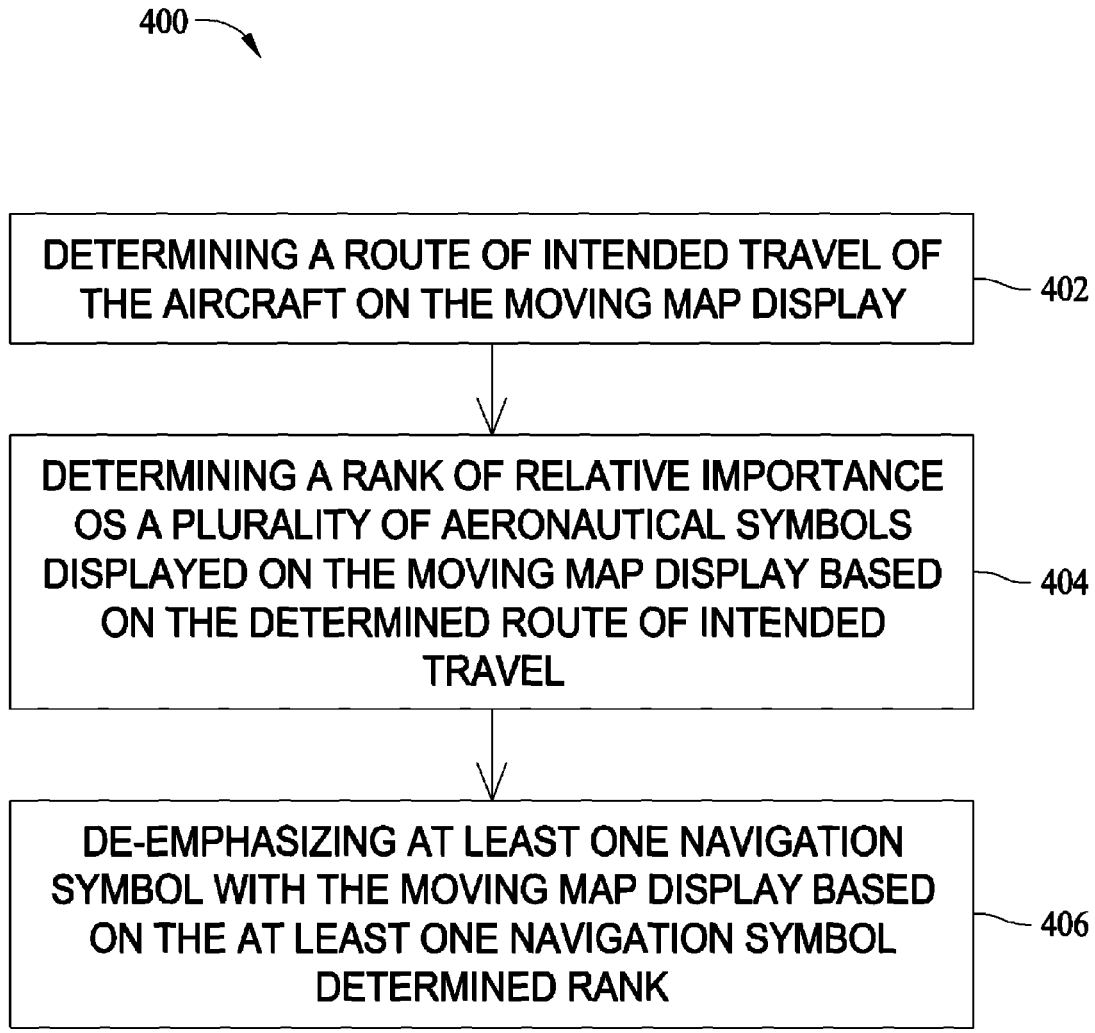
FIG. 4 is a flow chart of an exemplary method 400 of displaying a moving map display for an aircraft.

FIG. 4 is a flow chart of an exemplary method 400 of displaying a moving map display for an aircraft. Method 400 includes determining 402 a route of intended travel of the aircraft on the moving map display. In the exemplary embodiment, the route of intended travel is determined from a flight plan for the aircraft. In an alternative embodiment, the route of intended travel is determined from an input from a user. Method 400 also includes determining 404 a rank of relative importance of a plurality of aeronautical symbols displayed on the moving map display based on the determined route of intended travel. In the exemplary embodiment, the route of intended travel includes at least one track segment. The track segments are generally joined together at waypoints where the aircraft makes a transition from following a flight procedure associated with the current track segment to a flight procedure associated with a subsequent track segment. Determining a rank of relative importance of the plurality of aeronautical symbols may be based on the symbols probability of being used by the flight crew during the current segment being traveled or may be determined based on a probability of being used by the flight crew during the next segment to be traveled. As used herein, aeronautical symbols are those symbols typically found on aeronautical charts, such as, but not limited to a navigation symbol, an informational symbol, and a warning symbol. Method 400 further includes de-emphasizing 406 at least one navigation symbol with the moving map display based on the at least one navigation symbol determined rank. In various embodiments of the present invention the de-emphasis may be removed from the at least one navigation symbol based on an input from a user such that the user may override the de-emphasis feature to suit the particular need for more information at any segment of the flight plan. The de-emphasis may be controlled by controlling an opacity of the at least one navigation symbol by changing an alpha-blending value associated with the at least one navigation symbol. In the exemplary embodiment, the amount of alpha-blending is determined automatically based on the probability the symbol will be used during the current or a subsequent segment of the flight plan. In an alternative embodiment, the amount of alpha-blending is controlled based on a user input.

The above-described methods and systems for displaying an en-route map for an aircraft are cost-effective and highly reliable. A route of intended travel for the aircraft and aeronautical symbols are displayed such that symbols that are not useful for current flight operations are blended with the background of the map to reduce an amount of nonessential information displayed to facilitate reducing flight crew information overload. The methods and systems facilitate navigation and situation awareness in a cost-effective and reliable manner.

While the invention has been described in terms of various specific embodiments, those skilled in the art will recognize that the invention can be practiced with modification within the spirit and scope of the claims.

What is claimed is:

1. A method of displaying a moving map display for an aircraft comprising:
   determining a route of intended travel of the aircraft on the moving map display, the route of intended travel defined by a subset of a plurality of defined track segments;
   determining a rank of relative importance for a plurality of aeronautical symbols associated with the defined track segments and displayed on the moving map display, the rank for each aeronautical symbol based on a probability that a particular aeronautical symbol will be relevant when traversing a current track segment within the route of intended travel; and de-emphasizing at least one of the aeronautical symbols displayed on the moving map display, the de-emphasized symbols associated with track segments not within the route of intended travel, by blending the appearance of such aeronautical symbols with the moving map background behind such symbols based on the determined rank associated with each of the aeronautical symbols.

2. A method in accordance with claim 1 wherein determining a rank of relative importance of a plurality of aeronautical symbols comprises determining a rank of relative importance of a plurality of at least one of a navigation symbol, an informational symbol, and a warning symbol.

3. A method in accordance with claim 1 wherein determining a route of intended travel of the aircraft comprises determining which of the defined track segments are within the route of intended travel from a flight plan for the aircraft.

4. A method in accordance with claim 1 wherein determining a route of intended travel of the aircraft comprises determining which of the defined track segments are within the route of intended travel from an input from a user.

5. A method in accordance with claim 1 wherein determining a rank of relative importance of a plurality of aeronautical symbols associated with the defined track segments comprises determining a relevance of the plurality of aeronautical symbols to a next segment to be traveled.

6. A method in accordance with claim 1 further comprising removing the de-emphasis from the at least one navigation symbol based on an input from a user.

7. A method in accordance with claim 1 wherein blending the appearance of the at least one navigation symbol comprises changing an alpha-blending value associated with the at least one navigation symbol.

8. A method in accordance with claim 7 wherein blending the appearance of the at least one navigation symbol comprises changing the alpha-blending value based on a user input.

9. A display system for an aircraft comprising:
a moving map display screen configured to display a moving map representative of an area being traversed by the aircraft;
a route of intended travel of the aircraft superimposed on the moving map, the moving map including track segments in the route of intended travel and track segments not in the route of intended travel; and
a plurality of aeronautical symbols superimposed on said moving map in predetermined locations, the plurality of aeronautical symbols associated with one or more of the track segments, at least one of said plurality of aeronautical symbols including an opacity variable determined by a relative rank of importance associated with the at least one aeronautical symbols wherein the relative rank of importance is determined based on a probability that the aeronautical symbol will be relevant when traversing a track segment within the route of intended travel, the opacity variable configured to blend the appearance of the superimposed aeronautical symbols that are associated with track segments not in the route of intended travel with the moving map background.

10. A system in accordance with claim 9 wherein which of the defined track segments are within said route of intended travel of the aircraft is determined from a flight plan for the aircraft.

11. A system in accordance with claim 9 wherein which of the defined track segments are within said route of intended travel of the aircraft is determined based on an input from a user.

12. A system in accordance with claim 9 wherein said rank of relative importance of the plurality of aeronautical symbols comprises a relevance of the plurality of aeronautical symbols to a next segment to be traveled.

13. A system in accordance with claim 9 wherein alpha-blending of said plurality of aeronautical symbols is configured to be selectably toggled using an input from a user.

14. A system in accordance with claim 9 wherein an opacity of the at least one navigation symbol is configured to be modified by changing an alpha-blending value associated with the at least one navigation symbol.

15. A situational awareness system including a moving map display comprising:
at least one database comprising first data relating to a digital elevation model of a portion of the earth's surface, said model comprising a plurality of pixels, said digital elevation model including a location coordinate and an elevation value associated with each pixel, said at least one database further comprising second data relating to displaying a plurality of chart symbols on said moving map display, said second data comprising an opacity value associated with the plurality of chart symbols;
a processor coupled to the database, the processor configured to:
receive the location coordinate and an elevation value associated with the digital elevation model;
receive a route of intended travel for display on the moving map display, the route of intended travel defined by a subset of a plurality of defined track segments;
determine an opacity value for each of the plurality of chart symbols associated with the defined track segments based on a relevance of each individual chart symbol with respect to the defined track segments within the received route of intended travel; and
display a moving map including the plurality of chart symbols on the moving map display, the plurality of chart symbols displayed using the determined opacity value, at least one of the aeronautical symbols having an opacity value such that the appearance of such aeronautical symbols is blended with the moving map background behind such symbols, such aeronautical symbols associated with a track segment not within the route of intended travel.

16. A situational awareness system in accordance with claim 15 wherein the relevance of the plurality of chart symbols comprises a probability that the symbol provides information for traversing a portion of the received route of intended travel.

17. A situational awareness system in accordance with claim 15 wherein said processor is further configured to display a chart symbol that is alpha-blended with the moving map.

18. A situational awareness system in accordance with claim 15 wherein said first data is included in a first database of the at least one database and said second data is included in a second database of the at least one database, said second database being a separate database with respect to said first database.

* * * * *